United States Patent [19]
Hampton et al.

[11] 3,869,558
[45] Mar. 4, 1975

[54] PROCESS FOR MAKING A FREE FLOWING FLOUR

[75] Inventors: Richard John Hampton, Pierrefonds; John T. Shantz, Valois, Quebec; Thomas Gallo, Toronto, Ontario; Peter Unger, St. Lambert, Quebec, all of Canada

[73] Assignee: The Ogilvie Flour Mills Company, Limited, Montreal, Quebec, Canada

[22] Filed: Oct. 26, 1970

[21] Appl. No.: 83,803

[52] U.S. Cl................ 426/443, 426/148, 426/208
[51] Int. Cl.............................................. A21d 6/00
[58] Field of Search ................ 99/93; 426/443, 148

[56] References Cited
UNITED STATES PATENTS

| | | | |
|---|---|---|---|
| 3,368,904 | 2/1968 | Young et al. | 99/93 |
| 3,397,066 | 8/1968 | Somers et al. | 99/93 |
| 3,408,204 | 10/1968 | Swanson et al. | 99/93 |
| 3,445,239 | 5/1969 | Veault | 99/93 |

FOREIGN PATENTS OR APPLICATIONS

| | | | |
|---|---|---|---|
| 1,085,562 | 10/1967 | Great Britain | 99/93 |

Primary Examiner—Raymond N. Jones
Attorney, Agent, or Firm—Christen & Sabol

[57] ABSTRACT

This invention provides a free-flowing cereal flour product with a moisture content of between about 4 and about 10 percent with a characteristically high and stable viscosity as evidenced by Hagberg Falling Numbers of 240 seconds or over and substantially free of $\alpha$-amylase and lipid-degrading (e.g. lipase) enzymes. The product is made by subjecting a cereal flour with a normal native moisture content, say between about 10 and about 14 per cent by weight, to indirect heating under defined temperature conditions for a defined period in an environment in which the flour being treated is maintained under a protective blanket of water vapor derived from the vaporisation of the native moisture of the flour starting material. The heat-treated, viscosity-stabilized flour is especially well-suited for use as a food-thickener or meat emulsion binder.

7 Claims, 3 Drawing Figures

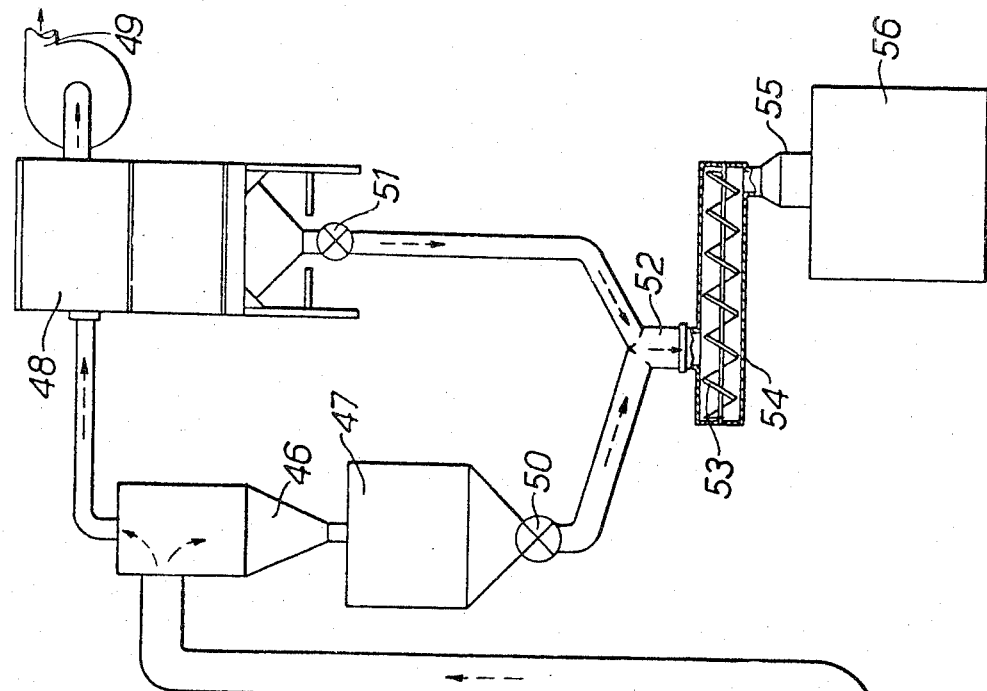
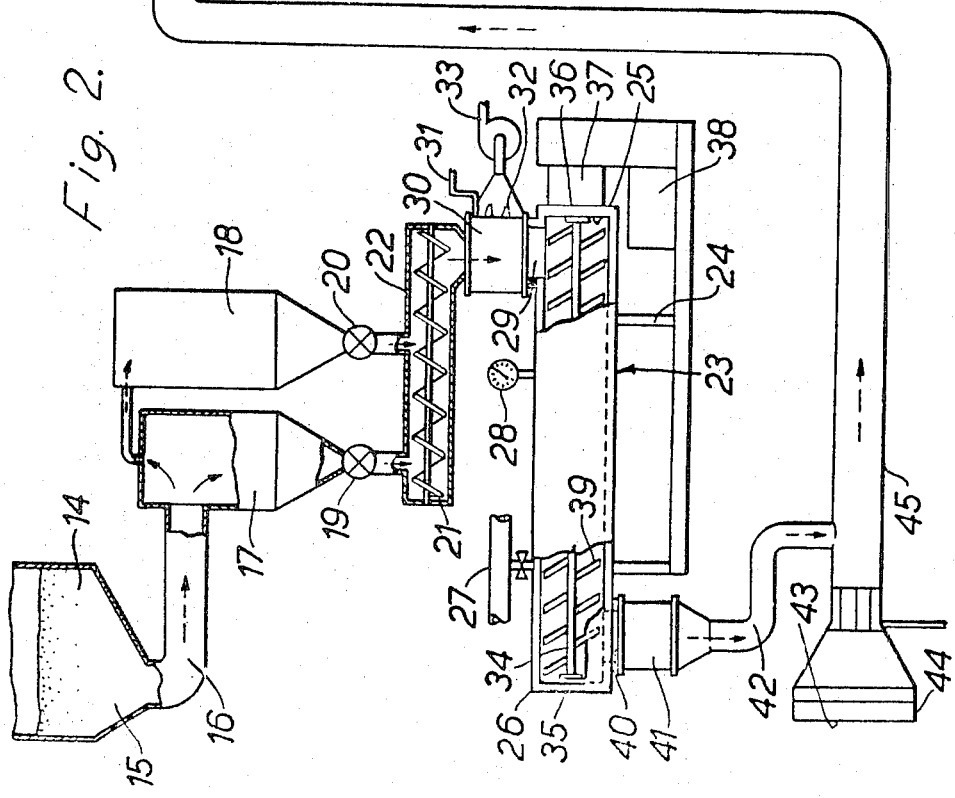
Fig. 2.

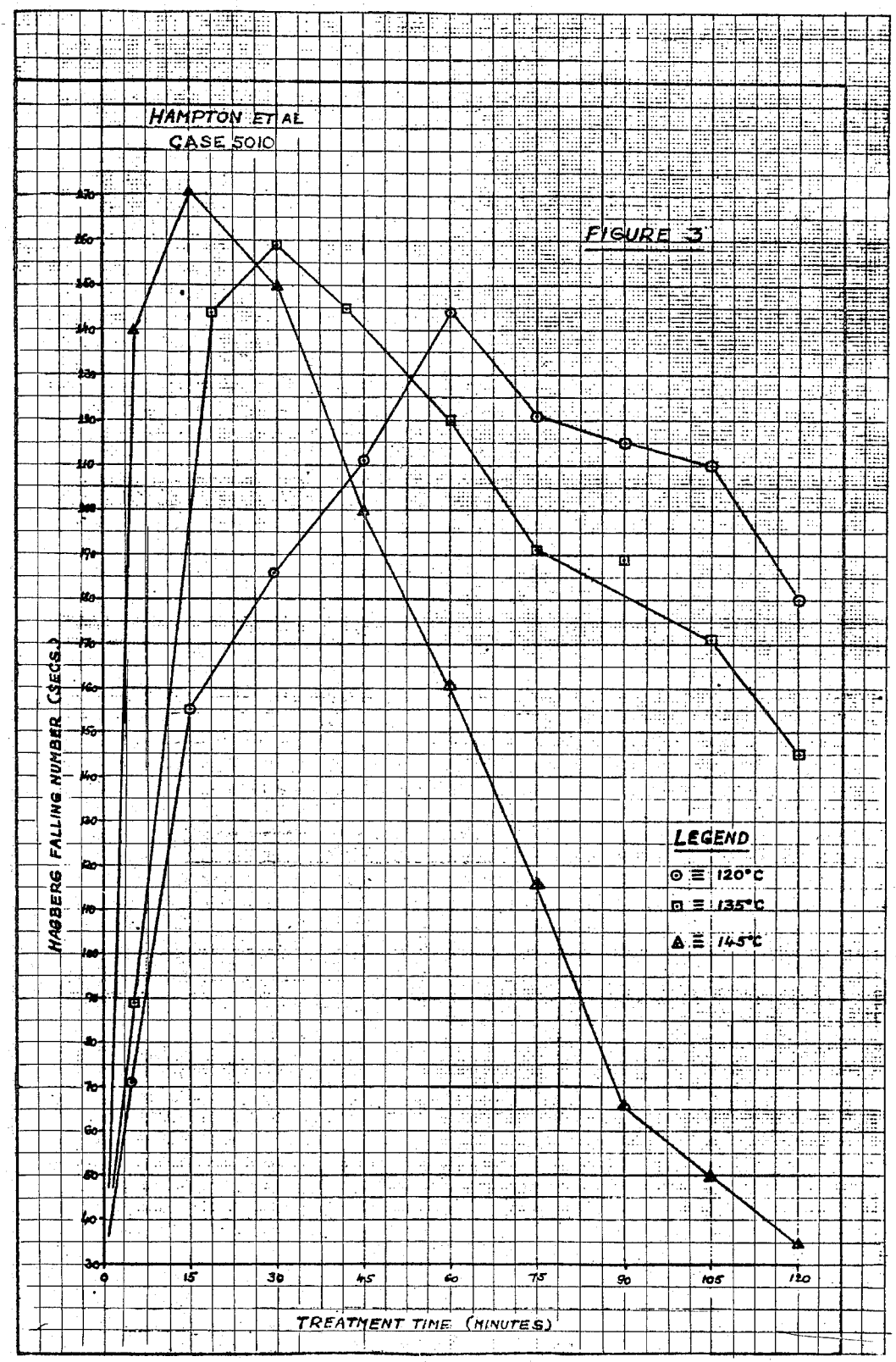

PROCESS FOR MAKING A FREE FLOWING FLOUR

BACKGROUND OF INVENTION

Statement of Invention

This invention relates to a novel cereal flour, to, processes for making it and products in which it is present as an ingredient. More particularly, the invention is concerned with a dry cereal flour which is especially wellsuited as a food thickener for use in the preparation, for example, of soups, liquorice, or as a meat emulsion binder for use in the preparation of sausages such, for example, as bolognas, frankfurters and wieners.

Description of the Prior Art

Cereal flour contains a starch fraction and, since wet starch granules are gelatinised by heat to give a high viscosity suspension it should be capable of giving a thick paste when cooked with water. However, when an aqueous slurry of a cereal flour such as a flour derived from wheat, rye and barley is cooked, the starch fraction is subject to degradation by the deleterious action in solution of enzymes, particularly $\alpha$-amylases, which naturally occur therein. Indeed, the capacities of flours for making satisfactory pastes such as thick soups and binders, when cooked in the presence of excess water roughly vary inversely with their enzyme amylase content and, even the best flours contain small and varying amounts of this enzyme, and therefore show variations between individual samples. It is generally recognized today that the deleterious action of the $\alpha$-amylases shows up in several distinct effects. A particularly adverse effect is an impairment of the waterretention capacity of the starch in the cooked paste which, in consequence, does not thicken to the same extent as it would if the flour contained no $\alpha$-amylase, i.e., reduced cooked paste viscosity. A second effect is the lowering of the resistance of the cooked gel to breakdown and thinning on further cooking and stirring, as may be necessary in certain applications such, for example, when the flour is used as a meat emulsion binder and accordingly is subjected to typical smokehouse conditions. A third effect, especially marked in flours of high $\alpha$-amylase activity, is a quicker thickening of the gel in the earlier stages of cooking. All three effects probably result from a disruption of the starch macromolecules with a weakening of the internal water-resistance of the starch granule by the amylase enzymes in the initial stages of gelatinisation, with consequent easier cooking subsequently by the hot water to give a thinner and weaker final gel.

The adverse effects of $\alpha$-amylase activity on the viscosity characteristics of cooked cereal flour pastes detract from the usefulness of cereal flours as a food thickener or meat emulsion binder. For instance, typical smokehouse conditions in the manufacture of sausage products normally involve exposure of the product to temperatures of about 70° to about 80°C. which is around the optimum temperature of $\alpha$-amylase activity. When, therefore, a cereal flour is used as the binder in such sausages, the $\alpha$-amylase enzymes present therein have a deleterious effect on the capacity of the floor to absorb available moisture from the meat emulsion which is necessary to give the desired, familiar firm texture to the sausage. A further disadvantage of cereal flour in the role of a meat emulsion binder, say, in the manufacture of sausages, is the presence therein of lipid-degrading enzymes, such as lipase and lipoxidase enzymes which attack the fat component present in the meat emulsion thereby promoting rancidity so reducing shelf-life and consumer acceptance.

Various procedures have been described in the prior art for the inactivation of $\alpha$-amylases present in flour or cereal grains. For instance, British patent specification No. 1,085,562 describes a heat treatment process in which a stream of wheat or flour, with a moisture content over 14 per cent in continuous travel through a worm conveyor is subjected to live steam at atmospheric pressure such that the material reaches a temperature of around 100°C., which is held for around 4 minutes. In U.S. Pat. No. 3,368,904 (Young et al.) a cereal flour in its normal "dry" state is exposed to pressurized steam at 5 to 30 p.s.i. for 5 seconds to 60 minutes after which the pressure is removed and the product flash dried to its original dry state, i.e. between about 10 and 14 percent moisture. In determining the efficacy of such heat treatments in destroying the $\alpha$-amylase content of flour it is customary to determine the viscosity or thickness of the cooked pastes by direct physical measurement with, say, the well-known Hagberg apparatus or Brabender Amylograph. The latter makes a continuous recording of the changing resistance to mechanical stirring of a flour-water slurry during a standardised cooking operation. In the Hagberg apparatus, the time taken for a plunger to fall through a flour-water paste is measured while this is being cooked in a boiling water-bath. The results are expressed as Hagberg "falling numbers" in seconds.

With regard to the viscosity of cooked pastes derived from such flours, the prior art (cf. the aforementioned British patent specification and The Research Association of British Flour-Millers' Bulletin, Vol. 14, 1963, pp. 5 - 11) teaches that with the heat treatments involving direct contact of the flour with steam the resulting flour has a Hagberg falling number of up to about 240 seconds maximum, typically up to about 200 seconds.

Objects of the Invention

The primary object of this invention is to provide a substantially free-flowing cereal flour in which the $\alpha$-amylase enzymes are substantially inactivated such that it is capable of yielding a highly viscous and stable cooked paste which consistently shows a higher viscosity as reflected in its Hagberg falling number determination than those hitherto attained.

Another object is to provide a substantially free-flowing cereal flour in which the lipid-degrading enzymes, such as lipase enzymes, are substantially inactivated the flour is well-suited for use as a meat emulsion binder, say, in the manufacture of sausage products.

A further object is to provide a relatively simple and convenient heat treatment process, involving indirect heat and defined temperature, time and moisture conditions, for producing said modified dry cereal flour.

A still further object is to provide cooked products such, for example, as soups, liquorice, and sausage products like frankfurters, bolognas and wieners in which the dry cereal flour is present as an ingredient thereof.

These and other objects and advantages of this invention will become apparent from the following description taken in conjunction with the accompanying drawings, wherein:

FIG. 2 is a schematic representation of a heat treatment assembly for effecting the process on a continuous basis; and FIG. 3 is a graph showing the relationship between process conditions (time and temperature) and the Hagberg falling numbers of cooked pastes derived from heat-treated flours.

BRIEF DESCRIPTION OF INVENTION

Figure 1:
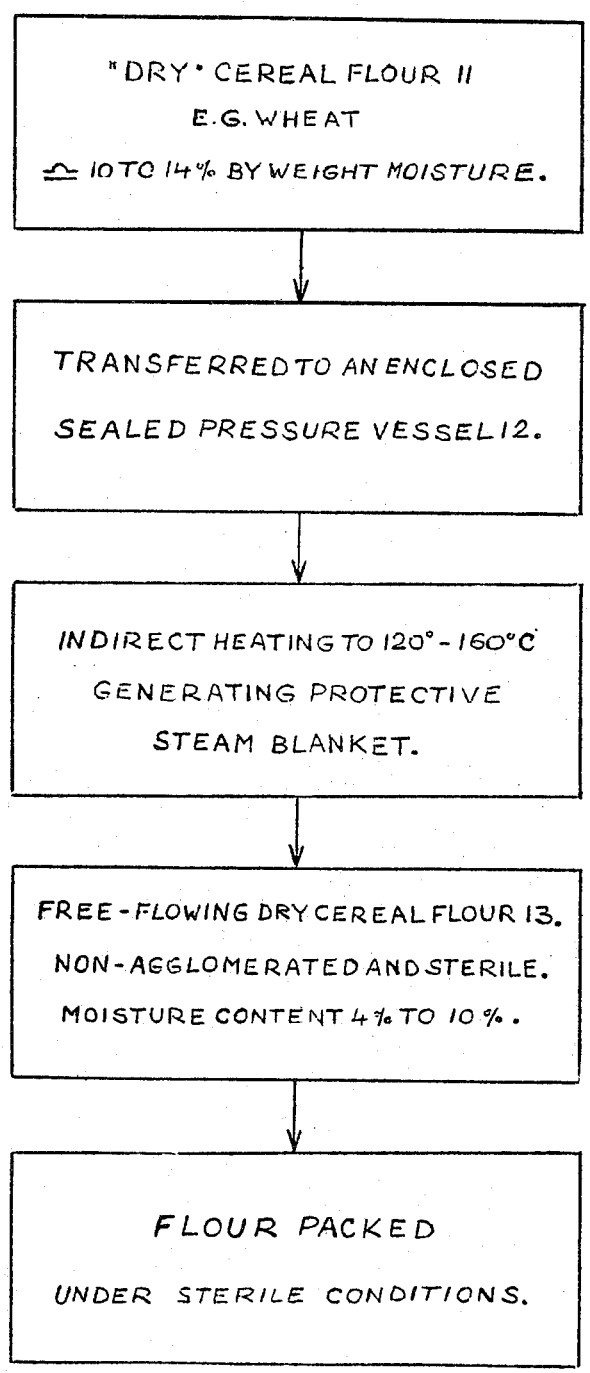
FIG. 1 is a flow sheet showing a process for obtaining the dry cereal flour of this invention.

The free-flowing cereal flour provided by this invention, in one of its composition of matter aspects, contains a nongelatinised or hydrolysed starch fraction, a denatured protein fraction and substantially no active α-amylase and lipiddegrading enzymes, characterised by a moisture content of between 4 per cent and 10 per cent by weight and in yielding a cooked aqueous slurry (5 per cent flour by weight) with a Hagberg falling number of at least 240 seconds, preferably over 270 seconds.

The modified cereal flour product of this invention may be obtained by a process in which a cereal flour with a conventional native moisture content of up to about 15 per cent by weight maximum, say, between about 10 per cent and about 14 per cent by weight, contained within an enclosed vessel is heated indirectly to a temperature of between about 120° to about 160°C., holding the temperature for at least about 5 minutes whereupon moisture present in the flour vaporizes to form an atmosphere of water vapor around the flour, while agitating said flour so as to substantially preclude the formation of agglomerates.

DETAILED DESCRIPTION OF THE INVENTION

The α-amylase enzymes present in flour of a conventional native moisture content, typically between about 10 per cent and about 14 per cent, are substantially completely inactivated at temperatures of between about 100° to 110°C. Nonetheless, even prolonged exposure at such temperatures does not result in the modifications that give a cooked paste with the desired Hagberg falling number of 240 seconds or over. Accordingly, the success of this invention in providing cereal flours from which a very viscous and stable cooked paste can be derived cannot be due to enzyme inactivation alone, for, in that event, there would be no significant improvement in the Hagberg falling number once α-amylase inactivation was substantially complete as it is at around 110°C. Consistent with this observation, it has been noted that cooked pastes derived from cereal flours of this invention usually show a higher Hagberg falling number than pastes derived from comparable refined starches which contain no α-amylase enzymes and not therefore subjected to the deleterious action in solution of such enzymes. While the phenomenon causing this surprising increase in Hagberg falling number, i.e. viscosity, of the pastes derived from the cereal flour of this invention is imperfectly understood at the present time, it may be speculated that it is due to a desirable modification of the flour, perhaps arising from a synergistic interaction between the starch and gluten components thereof. Certainly, the modification is not that of starch gelatinisation, because there is no development of the marked and objectionable stickiness with the formation of agglomerated and lumpy material of an undesired hardness and toughness (coarse texture) which usually accompanies this phenomenon. The modification of the cereal flours so permitting the attainment of cereal flour pastes of characteristically high Hagberg falling numbers by this convenient heat-treatment procedure is the novel and unexpected feature of the invention.

From the foregoing, it will be readily appreciated that the temperature to which the flour is subjected and the period of time for which it is held at that temperature, must be so correlated and controlled as to effect the desired effects on the cereal flour, i.e. inactivation of enzymes and modification of the flour itself, but must not be so severe as as to produce undesirable effects which it has been found may be brought about by heating at too high a temperature and/or by unduly extending the period of treatment under certain conditions. These undesirable effects, which again are imperfectly understood at the present time, are believed to be due to changes in the molecular structure of the starch associated with substantial case-hardening of the starch granules. If this occurs the capacity of the starch granules to gelatinise when subjected to the appropriate conditions is noticably inhibited, and there is a correspondingly marked reduction in the viscosity of a cooked flour paste.

Generally speaking the temperature to which the flour is subjected should be between about 120° and about 160°C. Thus, even prolonged exposure, say of the order of 2 to 3 hours, to temperatures much below about 120°C. do not give cereal flours which yield cooked pastes of the characteristically high and stable viscosity (as evinced by Hagberg falling number and Amylograph determinations), notwithstanding the fact that α-amylase inactivation is substantially complete. On the other hand, at temperatures much about 160°C., even slight overexposure results in pronounced case-hardening of the starch granules, which is reflected in a marked drop in the viscosity of cooked pastes derived from such flours, so that process control is difficult. As to the time for which the flour must be heated, this is normally a period of from about 5 to about 60 minutes, typically with the shortest periods for the higher temperatures, say, around 150° to 160°C., and the longest periods for the lower temperatures, say, around 130° to 140°C.

The optima in treatment temperature and time vary depending upon such factors as protein content, native moisture content and particle size of the flour, as well as on other process conditions. Illustrative optima conditions of temperature and time for different flours are shown in some of the Examples which follow. Moreover, for a given cereal flour starting material, these optima can be readily determined by conducting a few trial runs in which the parameters are varied within the ranges 120° to 160°C. and 5 to 60 minutes.

The process may be conducted in a batch or continuous operation. In both types of operation, the basic process steps involved are shown in FIG. 1 of the accompanying drawings, to which reference will now be made. The starting material 11 is a cereal flour with only its native moisture content which usually is between about 10 and about 14 per cent (cf. the table on page 7 of Matz, "Baking Technology and Engineering", The Avi Publishing Company, Inc., Westport, Conn., 1960), and commonly spoken of in the trade as a dry cereal flour. It will usually have a particle size such that substantially all passes at least a No. 100 Sieve (149 micron), U.S. Sieve Series ("Chemical Engineers' Handbook", 3th Edition, 1963, McGraw Hill Book Company, 21–51) and be free-flowing. Several types of milled cereal flours may be employed in this invention, though wheat flour, since wheat flour products have the greatest utility, are most commonly used. With regard to wheat flours, it has been found that both hard and soft wheat flours, including various mill fractions thereof, can be satisfactorily processed. This cereal flour is admitted to an enclosed sealed pressure vessel 12 which is associated with heating means whereby the flour is indirectly heated to a desired temperature in the range 120° to 160°C. Most conveniently, the flour is heated through the vessel walls by means of saturated steam contained within a lagged jacket surrounding the vessel. This steam is preferably employed at a pressure somewhat higher than appropriate for the temperature at which it is desired to subject the cereal within the vessel. As shown in standard steam tables (for instance, as set forth in Chemical Engineers' Handbook, op. cit. 3-191) the corresponding steam pressures for temperatures of 120° and 160°C. are about 15 and about 75 p.s.i.g. respectively. However, since the flour is heated indirectly through the walls of the vessel, it is convenient (in reducing processing time) to have the steam at higher pressures, say, 10 to 35 p.s.i.g., i.e. between about 25 and about 110 p.s.i.g., than those indicated in the steam tables as corresponding to a particular temperature in the range of 120° to 160°C. Also, it is sometimes desirable to preheat the vessel (via the stem jacket) prior to the admittance of the flour, otherwise, condensation may occur in the vessel. The heat treatment to which the cereal flour is subjected vaporises a substantial proportion of the native moisture content into steam, so providing a moist steam atmosphere within the vessel. It is believed that this in-situ developed moisture by forming a protective blanket around the flour plays an important role in accomplishing the desired modifications to the cereal flour without cooking, oxidative degradation and starch gelatinisation taking place. With moisture contents of less than about 8 per cent, i.e. with dehydrated or pre-dried cereal flour, it is found that the foregoing processing conditions result in oxidative degradation changes, whilst at moisture contents in excess of about 14 per cent, i.e., pre-moistened cereal flours, cooking and starch gelatinisation occur, with the development of marked and objectionable stickiness in the flour favouring the formation of lumps or agglomerates. Desirably, throughout the heat treatment, the cereal flour is agitated to reduce any tendency for individual particles to adhere together, with the formation of agglomerates, for it is important that the resulting product should be free-flowing. The heat-treated viscosity stable flour 13, at the end of a pre-selected residence time, is removed from the vessel, whereupon the sudden drop in pressure flash dries the flour. For all purposes, he resulting product is a dry cereal flour with a moisture content substantially lower than the initial moisture content, say, between 4 per cent and 10 per cent, usually in the range between about 4 per cent and about 8 per cent and preferably between about 4 per cent and 6 per cent, depending upon the native moisture content and the precise processing conditions. This flour product resembles the starting material, being substantially free-flowing and with few lumps. It contains all of the original flour components but with the amylase enzymes essentially completely inactivated and, it is believed, the flour particles modified in some desirable, but presently unknown, fashion, which is quite different in resulting effect than simple starch gelatinisation. The flour is then packaged, usually, under sterile conditions.

FIG. 2 of the accompanying drawings shows a diagrammatic representation of an arrangement adapted for continuous operation of the process of this invention to yield the desired viscosity-stabilized dry cereal flour product. In this figure, the reference numbers designate the following features:

| | |
|---|---|
| 14— | cereal flour; |
| 15— | bulk storage bin; |
| 16— | pneumatic conveyor; |
| 17— | cyclone; |
| 18— | dust collector; |
| 19 & 20— | rotary air lock valves; |
| 21— | screw conveyor; |
| 22— | horizontal chamber; |
| 23— | stainless steel pressure vessel; |
| 24— | pressure vessel frame; |
| 25— | inner cylindrical shell; |
| 26— | outer cylindrical shell jacketing the inner shell; |
| 27— | valved steam inlet pipe; |
| 28— | pressure gauge; |
| 29— | inner shell inlet; |
| 30— | rotary pressure lock valve; |
| 31— | air inlet pipe; |
| 32— | steam exhaust vents; |
| 33— | suction blower; |
| 34— | central drive shaft; |
| 35 & 36— | journalled support bearings; |
| 37— | gear reducer; |
| 38— | electric motor; |
| 39— | inclined paddles; |
| 40— | outlet pipe; |
| 41— | rotary pressure lock valve; |
| 42— | outer duct; |
| 43— | air intake; |
| 44— | air filter; |
| 45— | cooling and drying duct; |
| 46— | cyclone; |
| 47— | cyclone hopper; |
| 48— | dust collector; |
| 49— | suction blower; |
| 50 & 51— | rotary air locks; |
| 52— | outlet duct; |
| 53— | screw conveyor; |
| 54— | horizontal chamber; |
| 55— | duct; and |
| 56— | storage bin |

In operation, a starch-containing cereal flour 14, such as wheat flour, is transferred by the pneumatic conveyor 16 from the bulk storage bin 15 to the cyclone 17 in which the flour and air are separated, the latter passing over into the dust collector 18. Controlled and measured amounts of the flour are transferred through rotary air lock valves 19 and 20 from the base of the cyclone and dust collector respectively onto the screw conveyor 21 located in a horizontal chamber 22. This screw conveyor transports the flour along to a rotary pressure lock valve 30 located adjacent the inlet 29 to the inner cylindrical shell 25 of the stainless steel pressure vessel 23. The valve releases a measured flow of the flour into the inner shell serving as the treatment zone.

The air inlet pipe 31 provides for the ingress of a small amount of hot air (approx. 229°F.) into the rotary valve to purge small amounts of steam trapped in the rotating valve in moving from an open to a closed position, thereby preventing the condensation of steam on the flour being transferred into the vessel by the valve. The steam egresses through vents 32 located in the wall of the valve and connected to a suction blower 33. The valve may include scraper means (not shown) to effect a positive cleaning action thereby assisting in transferring the flour into the inner shell.

Within the inner shell of the pressure vessel, the central shaft 34 is continuously rotated by the electric motor 38 to which it is drivably connected through the gear reducer 37. The included paddles 39 on the central shaft extend outwardly into close proximity with the shell wall. Since the central shaft is rotated at relatively high speeds, e.g. 100 to 140 r.p.m., the flour within the vessel is acted upon by both linear and centrifugal forces. Under the action of the linear forces, the flour is moved progressively along the inner shell from the inlet to the outlet thereof, while under the action of the centrifugal forces, the flour tends to be thrown against the inner surface of the shell wall. The combined forces serve to advance the flour essentially in the form of a thin layer pressed against the shell wall through the shell with individual particles in the layer in constant motion. The progression of the flour through the shell as an advancing layer in contact with the shell wall ensures effective and relatively uniform heat transfer, and a low incidence of burned particles and agglomerate formation. The mean residence time of flour within the shell is preselected and controlled (e.g. by adjusting the flour input and output rates, rotational speed and paddle angle), depending upon such other factors as the temperature conditions and the type of flour being treated. Usually, the residence time is of the order of between about 5 and about 20 minutes, but shorter and longer periods in the range between about 5 and about 60 minutes, are possible.

The inner shell of the pressure vessel is surrounded by the lagged jacket 26 provided with a valved steam inlet pipe 27 whereby the jacket can be supplied with a constant steam pressure as indicated on the pressure gauge 28, in the range of about 25 to about 110 p.s.i.g. such that the shell wall is heated to a temperature of about 130° to 170°C. This heat is transferred to the flour as it moves along the wall of the inner shell which serves as an effective heat exchanger whereby the advancing flour inside the shell is heated to a temperature in the range between about 120° and 160°F. Intimate contact between the flour particles and the shell wall is promoted by the continuous agitation of the flour effected by the rotating paddles 39 which also have a self-scouring action preventing the accumulation of flour on the shell wall. The continuous mixing of the flour as it progresses along the shell assists in preventing the formation of agglomerates or lumps. The moisture present in the flour vaporises on exposure to the processing temperatures to form an in-situ generated steam atmosphere (e.g. 10 to 30 p.s.i.g.) within the inner shell which blankets the flour layer. Any substantial egress of this steam is precluded by the pressure lock valves. If desired, to compensate for any steam that may leak from the inner vessel, a small amount of steam can be introduced from an external source, but this is normally not necessary.

On reaching the downstream end of the inner shell, the heat-treated flour enters the outlet pipe 40 and is discharged through the rotary pressure lock valve 41 into a duct 42. At the base of the duct, the heat-treated flour product is entrained in a stream of cold air, which has been sterilized by passage across an air filter 44, and conveyed along the cooling and drying duct 45.

Since the flour leaves the shell at a relatively high temperature and immediately enters a cooler environment, a substantial content of the residual moisture present in the flour at this point is flashed-off in the form of vapor, before the particles are cooled. To avoid condensation of this vapor, which is undesirable, the air flow should be large enough to absorb the moisture that escapes from the flour. The flour is separated from the air stream in cyclone 46 and falls down into the hopper 47. The air passes over into dust collector 48 connected to the suction blower 49. From the hopper and the base of the dust collector, the dry (about 4 per cent to about 10 per cent moisture) flour product is transferred through rotary air lock valves 50 and 51 into an outlet duct 52 and drops into a screw conveyor 53 located in chamber 54. The screw conveyor transports the material to a duct 55 which connects with a large capacity bin 56 in which the product is stored prior to being packaged, usually in sterilized bags under sterile conditions.

The following Examples will serve to further illustrate the invention. However, it is not intended to be limited thereby. The Brabender Amylograph, Hagberg falling number and enzyme inactivation (sugar estimation) results referred to in Examples hereinafter were determined by the following procedures.

Brabender Amylograph

The procedure involved was that set forth in Cereal Chemistry, Volume 34, No. 3, 1957, p. 142, "Graphical Analysis of the Brabender Viscosity Curves of Various Starches" by Mazurs et al. utlizing a viscometer manufactured by C. W. Brabender Instrument Company set to operate at 75 r.p.m. and equipped with a 700 cmg. torsion head.

Hagberg Falling Number

The procedure involved was that set forth in Cereal Chemistry, Volume 37, 1960, p. 218 to p. 222, "A Rapid Method for Determining Alpha Amylase Activity" by S. Hagberg using similar apparatus to that described therein.

Enzyme Inactivation - Sugar Determination

The amount of soluble sugar released from a given weight of flour heated at 30°C. for 2 hours was estimated spectophotometrically by a standard procedure involving incubation of a 10 g. sample mixed with phosphate buffer for 2 hours at 30°C., inactivation of enzyme activity with trichloroacetic acid and complex formation with anthrone which forms a colored complex with soluble sugars. The results are expressed in micrograms ($\mu$g) sugar released per gm. flour per minute.

EXAMPLE 1

This example illustrates the effect of varying temperature and time during the heat treatment on the properties of the cereal flour product, in this instance, a wheat flour.

Apparatus

A steam-jacketed double cone commercially available blender equipped ith a thermister probe to monitor sample temperatures during processing was used. The flour contained within the inner cone was heated indirectly by pressure steam admitted to the outer cone serving as a steam jacket. with Flour The cereal flour starting material was a commercially available "C Stream" flour obtained from Red Spring Wheat. The specification was as follows:

| | |
|---|---|
| Protein | 19.03% dry basis |
| Ash | 0.92% dry basis |
| Moisture | 9.3% by weight |

Procedure

The treatment chamber of the blender was preheated prior to charging with flour by circulating steam at a pressure in the range of 30 to 50 p.s.i.g. depending upon the desired operating temperature through the jacket. 5 Lb. flour samples were successively sealed in the treatment chamber. Each sample, while being continuously agitated, was heated at a temperature of 130°C. (steam jacket pressure = 30 p.s.i.g.) for a definite period of time as indicated in the following table. Various properties were determined on each flour sample at the end of the run. The procedure was then repeated twice with fresh samples of flour and at an operating temperature of 139°C. (steam jacket pressure = 40 p.s.i.g.) and 145°C. (steam jacket pressure = 50 p.s.i.g.). The thermister probe confirmed that in each run the flour attained the desired temperature in a matter of a few minutes.

Results

The results of the property analyses are summarized in Table 1 which follows. This table also includes, for comparative purposes, corresponding data for the untreated flour starting material.

EXAMPLE 2

Using the same apparatus, the procedure of Example 1 was repeated in three runs at 120°C., 135°C., and 145°C. with a treatment period ranging from 5 minutes to 120 minutes in each of the three runs. The flour treated was a commercially available clear flour which was obtained from Hard Wheat, and had the following specifications:

| | |
|---|---|
| Protein | 14.5% dry basis |
| Ash | 0.85% dry basis |
| Moisture | 12.1% by weight |

In the graph reproduced as FIG. 3 of the accompanying drawings, the results of the Hagberg falling number determinations for flour from each of the three runs for a given treatment time are plotted against treatment time. The relationship between treatment temperature and duration of the treatment are clearly shown in this graph. The higher the temperature at which the flour is treated, the shorter the treatment period needed to attain the maximum viscosity (as established by the Hagberg falling number), and the higher the maximum viscosity actually attained. Also, the graph shows that continuation of the treatment after the maximum viscosity is attained is accompanied by a marked falling-off in the viscosity, which is attributed to case-hardening of individual starch granules in the flour.

EXAMPLE 3

Using the same apparatus the procedure of Example

TABLE I

| Property | Treatment time (mins.) | Untreated flour | Run No. 1 Heat treated flour (130°C) | Run No. 2 Heat treated flour (139°C) | Run No. 3 Heat treated flour (146°) |
|---|---|---|---|---|---|
| Hagberg falling number (seconds) | 0 | 150 | 150 | 150 | 150 |
| | 5 | | — | 309 | 249 |
| | 10 | | 345 | 340 | 348 |
| | 15 | | — | 397 | 356 |
| | 20 | | 369 | 378 | 347 |
| | 25 | | — | 356 | 342 |
| | 30 | | 379 | 360 | 338 |
| | 40 | | 398 | — | — |
| | 45 | | 420 | 350 | 283 |
| | 50 | | 389 | — | — |
| | 60 | | 274 | 310 | 277 |
| Soluble Sugars determination (μg. sugar/gm. flour/min.) | 0 | 84.069 | | 84.069 | |
| | 5 | | | 32.614 | |
| | 10 | | not determined | 22.171 | not determined |
| | 15 | | | 18.802 | |
| | 20 | | | 16.629 | |
| | 25 | | | 15.574 | |
| | 30 | | | 15.544 | |
| | 40 | | | — | |
| | 45 | | | 6.857 | |
| | 50 | | | — | |
| | 60 | | | 6.714 | |
| Total Bacterial Count/10 g. (standard total plate count) | 0 | 18,000 | 18,000 | 18,000 | 18,000 |
| | 5 | | — | 0 | 0 |
| | 10 | | 0 | 0 | 0 |
| | 15 | | — | 0 | 0 |
| | 20 | | 0 | 0 | 0 |
| | 25 | | — | 0 | 0 |
| | 30 | | 0 | 0 | 0 |
| | 40 | | 0 | — | — |
| | 45 | | — | 0 | 0 |
| | 50 | | 0 | — | — |
| | 60 | | 0 | 0 | 0 |
| Average moisture content (% by weight) | — | 11.1 | 5.9 | 5.4 | 4.6 |

1 was repeated at a temperature of 130°C. with a treatment period of 20 minutes using three different flours as follows:

Part A

A "Large Bakers" flour commercially available under the trade name "Glenora" (The Ogilvie Flour Mill Co. Ltd., Montreal, Canada) obtained from hard spring wheat which had the following specifications:

| | | |
|---|---|---|
| Protein | 14.9% | dry weight basis |
| Ash | 0.57% | dry weight basis |
| Moisture | 13.7% | by weight |

Part B

A soft spring wheat flour commercially available under the trade name "Glenrose" (The Ogilvie Flour Mill Co., Ltd., Montreal, Canada) which had the following specifications:

| | | |
|---|---|---|
| Protein | 9.5% | dry weight basis |
| Ash | 0.49% | dry weight basis |
| Moisture | 13.5% | by weight |

Part C

A barley flour of the following specifications:

| | | |
|---|---|---|
| Protein | 9.9% | dry weight basis |
| Ash | 0.93% | dry weight basis |
| Moisture | 19.8% | by weight | with which 0.25 percent by weight barley malt flour had been admixed.

Results

All three heat-treated flour products were free-flowing with very few lumps or agglomerates. For practical purposes, they could be described as "dry", though each contained residual moisture of between 4 to 6 percent. The Hagberg falling number and Brabender determinations are summarised in Table II which follows:

Table II

| | Part A | | Part B | | Part C | |
|---|---|---|---|---|---|---|
| Property | Untreated | Treated | Untreated | Treated | Untreated | Treated |
| Hagberg falling number (seconds) | 117 | 289 | 57 | 277 | 85 | 292 |
| Brabender Amylograph (B.U.) | | | | | | |
| Initial peak viscosity | 105 | 510 | 180 | 555 | 230 | 955 |
| Viscosity at 95°C. | 95 | 505 | 175 | 535 | 85 | 680 |
| Viscosity at 50°C. | 245 | 665 | 330 | 780 | 230 | 890 |
| Viscosity after one hour at 50°C. | 250 | 665 | 330 | 780 | 230 | 780 |

From the foregoing results, it will be noted that the heat-treated flours not only have a higher initial peak viscosity, but substantially maintain this higher viscosity after heating and subsequent cooling to 50°C. A further benefit of the heat treatment is the minimum concentration required for the cooled flour slurry to solidify as an apparently homogeneous solid — like blancmange — on cooling to room temperature. Whereas, pastes obtained from the heat-treated flour solidify at or above 5 percent, enzymatically active untreated flours often fail to solidify even at 7, 8 or 9 percent solid content, but separate into an unattractive heterogeneous suspension of solid particles in a thin aqueous medium.

EXAMPLE 4

The apparatus assembly shown in FIG. 2 was used to process continuously a flour starting material similar to that of Example 1. The pressure in the steam jacket was 100 p.s.i.g. and the mean residence time was 10 minutes in which time the flour reached a temperature of around 140°C. Typical properties of the "dry" free-flowing wheat flour product so-obtained are shown in the following Table III, which also includes, for comparative purposes, the corresponding properties of the untreated flour starting material.

Table III

| Property | Untreated flour | Heat-Treated flour |
|---|---|---|
| Hagberg falling number (seconds) | 40 | 295 |
| Brabender Amylograph (B.U.) | | |
| Initial peak viscosity | 95 | 560 |
| Viscosity at 95°C | 65 | 540 |
| Viscosity after 1 hr. at 95°C | 75 | 470 |
| Viscosity at 50°C | 175 | 550 |
| Viscosity after 1 hr. at 50°C. | 170 | 540 |
| Soluble sugar test (ug./gm./min.) | 119.8 | 28.4 |
| Total bacterial count (10 g.) | 18,000 | 0 |
| Moisture (% by weight) | 14 | 4.5 |
| Protein (% by weight basis) | 18 | 18 |
| Ash (% by weight basis) | 0.95 | 0.95 |
| Bulk density (lb./cu. foot) | 25 | 25 |
| Specific gravity | 1.4 | 1.4 |

From the results of the Brabender Amylographs, it will be noted that the treated flour not only attains a much higher viscosity, but that this higher viscosity is maintained after heating and holding and after subsequent cooling. A noteworthy feature about the heat-treated flour was the virtual disappearance of the raw cereal taste normally associated with a wheat flour. The dry free-flowing, product had a pleasant, mellow, "toast-like" flavor, and taste panel results showed that it was considered more generally acceptable than untreated wheat flour.

EXAMPLE 5

This example confirms that the high and stable viscosity of cooked pastes based on cereal flour products of this invention is not attributable solely to enzyme inactivation. In this Example the viscosity of such a paste (paste B) as determined by the Brabender Amylograph and Hagberg falling number procedures is compared with the viscosity of comparable pastes derived from:
i. The same flour untreated by the process of this invention — Paste A.
ii. A refined wheat starch (Supergel — a pure wheat starch commercially available from Industrial Grain Products, Thunder Bay, Canada) which has not been heat-treated by the process of this invention; on an equivalent flour weight basis — Paste C; on a basis equivalent to that of the starch content of an average flour, i.e. 80 percent of the flour weight, — Paste D.

iii. The same refined wheat starch heat-treated by the process of this invention; on an equivalent flour weight basis — Paste E; on a basis equivalent to that of the starch content of an average flour, i.e. 80 percent of the flour weight, — Paste F.

iv. An artificial flour composed of 80 percent starch by weight (dry basis) and 20 percent by weight gluten (dry basis) untreated (Paste G) and heat-treated by the process of this invention (Paste H).

Results

The Amylograph results are summarised in the following Table IV.

smokehouse conditions as simulated on the Brabender Amylograph. The flour used was similar to that used in Example 1 hereinbefore. The cooked pastes were prepared according to AACC Method 22—10 which is specifically designed to test α-amylase activity in cereal flours. The official procedure is modified in that the temperature of the cooked paste containing 15 percent by weight flour was not allowed to rise above 72°C. (an optimum temperature for α-amylase activity) whereas in the official method the temperature is raised to 95°C. which effectively inactivates the α-amylase enzymes. Once the temperature of 72°C. was reached, the test was continued for a total period of 2 hours. The flours prepared according to the procedure of Example 1 and Example 4 were used in the tests, and, for comparative purposes, similar tests were run on the corresponding Table IV

| PROPERTY | PASTE | | | | | | | |
|---|---|---|---|---|---|---|---|---|
| | A | B | C | D | E | F | G | H |
| Brabender Amylograph (Brabender Units) | | | | | | | | |
| Initial peak viscosity | 260 | 520 | * | * | * | * | * | * |
| Viscosity at 95°C | 210 | 520 | 650 | 105 | 735 | 130 | 250 | 280 |
| Viscosity after 1 hr. at 95°C. | 170 | 500 | 750 | 375 | 635 | 330 | 360 | 210 |
| Viscosity at 50°C. | 390 | 680 | 1330 | 665 | 1095 | 575 | 710 | 455 |
| Viscosity after 1 hr. at 50°C. | 360 | 625 | 1300 | 670 | 1165 | 585 | 720 | 495 |
| Hagberg falling number (secs.) | 150 | 399 | 294 | 19 | 220 | 26 | 56 | 165 |

*Initial peak viscosity attained only after 95°C. had been reached.

From the foregoing results, it will be noted that Paste B derived from a heat-treated wheat flour according to this invention showed a significantly higher viscosity increase (as reflected both in the Brabender Amylograph and Hagberg falling number determinations) than the comparable starch pastes E and F (whether on a flour or starch weight basis). Since the starch is initially enzyme free, then, were the viscosity increase attributable to enzyme inactivation alone, it would have been expected that the flour and the starch pastes should show comparable viscosity increases. It is also noteworthy that the large increase in viscosity given by the heat-treated flour cannot be simulated by replacing it with an artificial flour (Pastes G and H) containing the starch and gluten components of a natural flour.

Conclusion

The heat treatment not only inactivates the amylase enzymes present in the flour, but effects some non-obvious and, at the present time, inexplicable modification of the flour itself, possibly (though Applicants do not wish to be bound by this hypothesis) due to a synergistic interaction between the starch and gluten components when present in natural cereal flours.

EXAMPLE 6

This Example is intended to illustrate the behaviour of both heat-treated and untreated flour under typical untreated flours. The results obtained are summarised in Table V which follows:

Table V

| Brabender Amylograph | Flour | | | |
|---|---|---|---|---|
| | Eg. 1 | | Eg. 4 | |
| | Untreated | Treated | Untreated | Treated |
| Initial peak viscosity (B.U.) | 910 | 3470 | 315 | 3330 |
| Peak time (mins.) | 111 | 58 | 45 | 34 |
| Viscosity after 2 hours at 72°C (B.U.) | 890 | 2895 | 140 | 2810 |

These results clearly establish that under temperature conditions favouring α-amylase activity the heat-treated flour reaches a much higher viscosity in a shorter time than the corresponding untreated flour. It will also be noted that the heat-treated flours maintain a very high viscosity even on standing for a 2 hour period.

EXAMPLE 7

This example illustrates that enzymes other than α-amylases, for instance, lipases, are destroyed by the heat treatment. The inactivation of the lipases is established by determining the free fatty acid content of three identical vegetable oil samples which have been treated in the following manner:

A  1000 g. oil and 500 g. wheat flour (not heat-treated) were mixed together and subjected to heat (70°C.) over a period of 11 days.

B. 1000 g. oil and 500 g. flour heat-treated by the process of this invention (20 minutes at 130°C.) were mixed together and subjected to heat (60°C.) over a period of 11 days.

c. 1000 g. oil was subjected to heat (60°C.) over a period of 11 days.

Samples of the three oils were drawn-off daily and free fatty acid content was determined by a standard method (A.O.C.S. No. ca 5a – 40). The results obtained are summarised in Table VI below, in which the free fatty acid content is expressed in milliequivalents of acid per 1000 g. oil.

Table VI

| Days | A | B | C |
|---|---|---|---|
| 1 | 0.0124 | 0.0079 | 0.0009 |
| 2 | 0.0144 | 0.0090 | 0.0009 |
| 3 | 0.0158 | 0.0090 | 0.0013 |
| 4 | 0.0174 | 0.0093 | 0.0023 |
| 7 | 0.0203 | 0.0096 | 0.0023 |
| 8 | 0.0209 | 0.0099 | 0.0023 |
| 10 | 0.0218 | 0.0099 | 0.0022 |
| 11 | 0.0226 | 0.0098 | 0.0024 |

As will be seen from the foregoing results the free fatty acid content of the oil subjected to exposure to heat-treated flour and that of oil alone are fairly constant and parallel to each other, whereas the free fatty acid content of oil subjected to exposure to non-heat-treated flour continuously increases. This is of particular significance to the meat packer during smoke-curing of meat products, notably sausages, because smoke-curing is done at temperatures which are extremely favourable to enzyme activity, in this case, that of lipase which by degrading fats would promote rancidity in the product and, therefore, reduce its shelf life and consumer appeal.

As previously mentioned herein, the dry cereal flour of this invention is particularly suitable as a binder in meat emulsion systems for use, say, in the manufacture of sausages like bolognas and frankfurters. In this capacity the cereal flour is mixed with the other ingredients of a meat emulsion system, say meat trimmings, seasoning and curing agents, at a level such that the cereal flour constitutes up to about 5 percent, typically around 3 percent, by weight of the emulsion system. The emulsion is then filled into the sausage casings and exposed to dry heat for ½ to 3 hours at temperatures of about 70° to about 80°C. in a smokehouse. At these temperatures (which are around the optimum for α-amylase activity) the starch component of the flour gelatinises and, in so-doing, absorbs, and thereby binds, the available moisture from the emulsion to give the desired firm texture sought for sausages. It also stabilizes the fat present in the emulsion thereby preventing the migration of fat to the surfaces or ends of the cases which results in the formation of "fat-caps".

EXAMPLE 8

This example illustrates the use of the heat-treated flour according to this invention in the manufacture of frankfurters.

| Ingredients | Content |
|---|---|
| Beef trimmings | 60 lbs. |
| Pork trimmings | 40 lbs. |
| Heat-treated flour (Example 4) | 3 lbs. |
| Ice | 8 lbs. |
| Cure | |
| Fine salt | 3 lbs. |
| Granulated cane sugar | 4 ozs. |
| Sodium nitrite | 1/4 oz. |
| Seasoning | |
| Ground white pepper | 5 ozs. |
| Ground mustard | 1 oz. |
| Ground coriander | 3 ozs. |
| Ground nutmeg | 2 ozs. |
| Granulated cane sugar | 3 ozs. |

Procedure

The beef and pork trimmings are separately ground through a ⅜ in. plate mincer, and then chopped in a roto-cutter along with the other ingredients added in the following order. The beef is placed in the roto-cutter first, followed by the flour, ice, cure and seasoning. Chopping is continued until a finely-cut product is obtained and all the water is taken up. The finely-chopped product is placed in a sausage stuffer which packs it tightly into cellulose casings. The long length of stuffed sausage is divided into 5 in. links, allowed to dry off, and then smoked in a smoke-house at 60¼C. for 2 hours and 72°C. for a further ½ hour under a moderately heavy smoke. Thereafter, the smoked sausage is transferred to a vapor cooker in which it is held at 82°C. for 10 minutes. After a cold water spray, the sausage is transferred to a storage cooler in which it is dried and chilled. Prior to packing in cartons, the cellulose casing is removed from the sausage. The sausage so-obtained is of good color and physical characteristics with no jelly or water pockets; the flavour is pleasing with no detectable raw cereal character, but a noticeable "toast-like" taste — it is noticed that the heat-treated flour blends (tastewise) with the other sausage ingredients better than ordinary cereal flour hitherto used as a binder.

The main features of the novel cereal flour which render it particularly suitable for use as a component of sausages, etc. are:

i. The high water-binding capacity;
ii. The high and stable viscosities of gels formed on gelatinisation of the starch component under smokehouse conditions;
iii. Amelioration of the raw cereal flavour associated with ordinary, i.e. non-heat-treated, flour;
iv. The product is substantially sterile; and
v. Because of the protein content (about 15 percent) it contributes toward the nutritive value of the meat product; and
vi. Absence of active lipid-degrading enzymes like lipase and lipoxidase enzymes which would otherwise promote the development of rancidity and reduce product shelf life.

In addition to its use as a binder in sausage formulations, the heat-treated cereal flour is also useful in other applications such, for example, as a thickener in soups, for which purpose it would normally be used in an amount of up to about 10 percent by weight, usually between about 3 percent and about 10 percent by weight, and in the manufacture of a variety of canned products.

While the invention has been described with reference to various examples and embodiments, it will be apparent to those skilled in the art that various changes and modifications can be made and, to the extent that such variations incorporate the principles and true nature of the invention, they are intended to be included within the scope of the appended claims. In the claims, the Hagberg falling numbers and Brabender Amylographs were determined by the standard procedures described in the passage before the examples.

What is claimed is:

1. Process for making a free-flowing dry cereal flour with a non-gelatinized or non-hydrolyzed starch fraction, a denatured protein fraction and substantially no active α-amylase and lipid-degrading enzymes, said flour being characterized by a moisture content of between about 4 and about 10 per cent by weight and an ability to yield a cooked aqueous slurry with a Hagberg falling number of at least 270 seconds which comprises indirectly heating a natural cereal flour with a conventional native moisture content of about 8 to about 15 per cent by weight within an enclosed vessel to a temperature of about 120° to about 160°C., holding the temperature within this range for about 5 to about 60 minutes, whereupon the moisture vaporizes to provide an atmosphere of water vapor around the flour while agitating said flour so as to substantially preclude the formation of agglomerates, and removing said flour from said vessel thereby reducing its conventional native moisture content to the desired level of between about 4 and about 10 percent.

2. Process as claimed in claim 1 in which the vessel is heated through the vessel walls by means of saturated steam contained within a lagged jacket surrounding the vessel.

3. Process as claimed in claim 1 which is conducted as a batch operation.

4. Process as claimed in claim 1 which is conducted as a continuous operation.

5. Process for making a free-flowing, dry cereal flour in which a natural cereal flour with a conventional native moisture content of about 8 to about 15 per cent by weight is admitted to the inner shell of a pressure vessel, continuously advanced through the inner shell along a surface thereof by means of rotating paddles located within the inner shell while being heated indirectly to a temperature of between about 120°C. and about 160°C. by means of saturated steam admitted to a steam jacket surrounding the inner shell, which vaporizes the native moisture present in the flour so providing a protective steam atmosphere of 10 to 35 p.s.i.g. within the inner shell, holding the temperature within the range for about 5 to about 60 minutes, and withdrawing the heat-treated flour from the inner shell thereby flash-drying the heat-treated flour to substantially reduce its conventional native moisture content to the desired level of between about 4 and about 10 per cent.

6. Process as claimed in claim 5 in which the saturated steam is at a pressure of between about 5 and 110 p.s.i.g.

7. Process as claimed in claim 5 wherein the moisture content of the heat-treated flour is reduced to between about 4 and about 6 per cent.

* * * * *